United States Patent
Forder (10) Patent No.: US 11,294,696 B2
(45) Date of Patent: Apr. 5, 2022

(54) VIRTUAL DESKTOP INFRASTUCTURE MANAGEMENT BY A MANAGEMENT SERVICE ENROLLING AND DE-ENROLLING A VIRTUAL MACHINE WITH AN ENDPOINT MANAGER

(71) Applicant: VMware, Inc., Palo Alto, CA (US)

(72) Inventor: Oliver Bernard Forder, Peterborough (GB)

(73) Assignee: VMWARE, INC., Palo Alto, CA (US)

( * ) Notice: Subject to any disclaimer, the term of this patent is extended or adjusted under 35 U.S.C. 154(b) by 180 days.

(21) Appl. No.: 16/255,400

(22) Filed: Jan. 23, 2019

(65) Prior Publication Data
US 2020/0233682 A1 Jul. 23, 2020

(51) Int. Cl.
*G06F 9/451* (2018.01)
*G06F 9/455* (2018.01)

(52) U.S. Cl.
CPC .......... *G06F 9/452* (2018.02); *G06F 9/45558* (2013.01); *G06F 9/45533* (2013.01); *G06F 2009/45562* (2013.01)

(58) Field of Classification Search
CPC ............... G06F 9/452; G06F 9/45558; G06F 2009/45562; G06F 9/45533
See application file for complete search history.

(56) References Cited

U.S. PATENT DOCUMENTS

| 2009/0328030 A1* | 12/2009 | Fries .................. G06F 8/63 717/174 |
| 2011/0246786 A1* | 10/2011 | Laor ................. G06F 21/6227 713/189 |
| 2012/0117212 A1* | 5/2012 | Fries ..................... H04L 41/046 709/223 |
| 2015/0058054 A1* | 2/2015 | Basu ................. G06Q 10/06311 705/7.13 |
| 2015/0058837 A1* | 2/2015 | Govindankutty ... G06F 9/45558 718/1 |

(Continued)

OTHER PUBLICATIONS

Tripoli, Michael et al. "AMI Creation with Aminator" Mar. 22, 2013. Accessible at https://netflixtechblog.com/ami-creation-with-aminator-98d627ca37b0 (Year: 2013).*

*Primary Examiner* — Michael W Ayers
(74) *Attorney, Agent, or Firm* — Thomas Horstemeyer, LLP (57) ABSTRACT

A new approach to virtual desktop infrastructure management is described. In one example, a master virtual machine is configured to form a master image. The master virtual machine and master image are also modified to incorporate a service that performs an enrollment call to an endpoint manager associated with a virtual desktop infrastructure. One or more virtual machines are instantiated using the master image. When one of the virtual machines is booted and a user logs on, the service is invoked or executed and performs the enrollment call. The enrollment call leads to the enrollment of the virtual machine with the endpoint manager. During and after enrollment, the endpoint manager can configure the virtual machine based on one or more management policies. The management policies can be tailored in various cases, such as depending upon the credentials used to log on to the virtual machine.

20 Claims, 3 Drawing Sheets

(56) References Cited

U.S. PATENT DOCUMENTS

| | | | |
|---|---|---|---|
| 2015/0222604 A1* | 8/2015 | Ylonen | H04L 63/10 713/171 |
| 2015/0237132 A1* | 8/2015 | Antony | H04L 67/1095 709/224 |
| 2016/0139948 A1* | 5/2016 | Beveridge | G06F 9/5005 718/1 |
| 2018/0046488 A1* | 2/2018 | Sakamoto | G06F 9/45558 |

* cited by examiner

VIRTUAL DESKTOP INFRASTUCTURE MANAGEMENT BY A MANAGEMENT SERVICE ENROLLING AND DE-ENROLLING A VIRTUAL MACHINE WITH AN ENDPOINT MANAGER

BACKGROUND

Virtualization involves the logical arrangement and separation of various types of computing hardware, such as processors, network interface devices and resources, storage devices, and other computing resources. Virtualization can be relied upon as a way to logically segment or divide the hardware resources of server computers between different operating systems and applications executing on those operating systems. The software that creates virtual machines on hardware resources is often called a hypervisor or virtual machine monitor. The software that executes on a given virtual machine can be logically separated from that executing on other virtual machines. For example, the hardware resources of server computers can be virtualized to support two different types of operating systems, logically separated from each other, and supported by the same hardware resources.

Virtualization is one part of a trend in information technology to facilitate the cost-effective management and distribution of hardware resource pools. Virtualization can also be used to centralize administrative overhead and improve flexibility and scalability. Using virtualization, information technology administrators can also quickly manage updates and changes to the configurations of virtual machines and the operating systems and applications executing on the virtual machines. Virtual resources can be dynamically adapted to meet changing needs with less administrative overhead and other costs.

The widespread adoption of virtualization in various industries has fostered the foundation of cloud computing. The adoption of virtualization has resulted in the need for new, specialized virtualization management software to manage virtualized resources.

BRIEF DESCRIPTION OF THE DRAWINGS

Many aspects of the present disclosure can be better understood with reference to the following drawings. The components in the drawings are not necessarily drawn to scale, with emphasis instead being placed upon clearly illustrating the principles of the disclosure. In the drawings, like reference numerals designate corresponding parts throughout the several views.

DETAILED DESCRIPTION

The adoption of virtualization has resulted in the need for new, specialized virtualization management software to manage virtualized resources. A hypervisor or virtual machine monitor can be used on a desktop computing device to virtualize the computing hardware of the desktop computing device and instantiate a number of different operating systems, for example, that all execute on the same desktop computing hardware. In the context of a data center including a number server computers networked together, a virtual desktop infrastructure (VDI) can be used to collectively virtualize and manage the computing hardware of the servers in the data center.

VDI is a variation of the client-server model and provides an alternative to the client-server model. VDI is a virtualization approach in which a number of virtual machines, each executing a separate operating system (OS), are hosted on and managed in a data center. The image or display of each virtual machine can be delivered over a computer network to a client device, which allows a user to interact with the OS and any applications executing on the OS as if they were running locally on the client device. The client device can be a traditional desktop computer, a thin client, a mobile device, or any other suitable client device. Today, many software providers offer various types of VDI platforms.

The use of a VDI platform can have benefits, such as the ability to extend the lifespan desktop computers by repurposing them as VDI clients. Also, new VDI client can be cheaper than standard desktop computers. Also, because all data resides in the data center rather than on the client devices, there can be significant security benefits for VDI implementations.

However, some of the newer solutions for managing networked desktop computers are still not available on VDI platforms. For example, some of the modern management solutions that permit the central management of application installations, application updates, operating system updates, and other changes to networked desktop computers are still not available on cloud-based VDI platforms. In other words, many management solutions for groups of non-virtualized computing devices, such as a group of desktop computers, are not available for a group of virtual machines hosted using a VDI platform.

To address some of the current limitations of VDI platforms, a new approach to virtual desktop infrastructure management is described. The new approach permits the enrollment of virtual machines that are hosted on a VDI platform in an endpoint manager, similar to the way that groups of desktop computers are enrolled in unified endpoint management solutions.

In one example, a master virtual machine is configured to form a master image. The master virtual machine and master image are also modified to incorporate a management service that performs an enrollment call to an endpoint manager associated with a VDI. One or more virtual machines are instantiated using the master image. When one of the virtual machines is booted or initialized and a user logs on, the service is invoked or executed and performs the enrollment call. The enrollment call leads to the enrollment of the virtual machine with the endpoint manager, similar to the way that groups of desktop computers are enrolled in unified endpoint management solutions.

During and after enrollment, the endpoint manager can configure the virtual machine based on one or more management policies. The management policies can be tailored in various cases, such as depending upon the credentials used to log on to the virtual machine. The inclusion of the service that performs the enrollment call thus provides a hook for the enrollment of any virtual machines that result from the master image. Other aspects and benefits of the new approach are described in further detail below.

Figure 1:
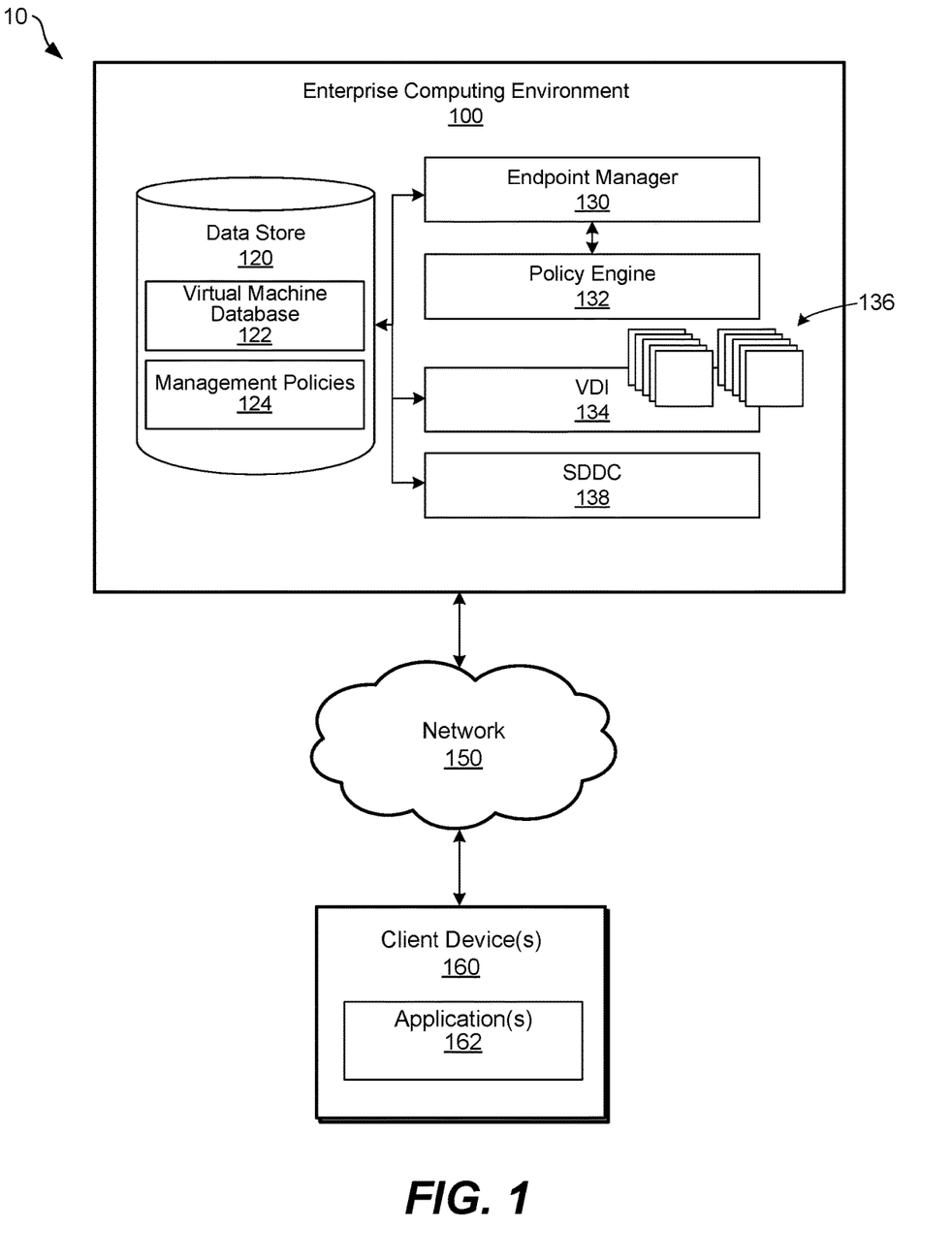
FIG. 1 illustrates an example networked environment for virtual desktop infrastructure management according to various examples described herein.

Turning to the drawings, the following paragraphs provide an outline of a networked environment followed by a discussion of the operation of the same. FIG. 1 illustrates an example networked environment 10 for virtual desktop infrastructure management according to various examples described herein. The networked environment 10 includes an enterprise computing environment 100, a network 150, and a number of client devices 160. Aspects of virtual desktop infrastructure management are described below with reference to the enterprise computing environment 100 and the client devices 160, but those components are representative and other networked environments and components can be relied upon to implement the concepts described herein.

The enterprise computing environment 100 can be embodied as one or more computers, computing devices, or computing systems. In certain embodiments, the enterprise computing environment 100 can include one or more computing devices arranged, for example, in one or more server or computer banks. The computing device or devices can be located at a single installation site or distributed among different geographical locations. The enterprise computing environment 100 can include a plurality of computing devices that together embody a hosted computing resource, a grid computing resource, or other distributed computing arrangement. In some cases, the enterprise computing environment 100 can be embodied as an elastic computing resource where an allotted capacity of processing, network, storage, or other computing-related resources varies over time. As further described below, the enterprise computing environment 100 can also be embodied, in part, as certain functional or logical (e.g., computer-readable instruction) elements or modules as described herein.

The enterprise computing environment 100 can function as a virtual desktop infrastructure platform incorporating endpoint management features. The enterprise computing environment 100 includes a data store 120, an endpoint manager 130, a policy engine 132, a VDI 134 supporting a number of virtual machines 136, and a software-defined data center (SDDC) 138. The data store 120 includes areas in memory for storage of a virtual machine database 122 and management policies 124, among other types of data. The components and operation of the enterprise computing environment 100 are described in further detail below.

The network 150 can include the Internet, intranets, extranets, wide area networks (WANs), local area networks (LANs), wired networks, wireless networks, cable networks, satellite networks, other suitable networks, or any combinations thereof. As one example, the enterprise computing environment 100 and the client devices 160 can be respectively coupled to one or more public or private LANs or WANs and, in turn, to the Internet for communication of data among each other. Although not shown in FIG. 1, the network 150 can also include communicative connections to any number and type of network hosts or devices, such as website servers, file servers, cloud computing resources, databases, data stores, or any other network or computing architectures.

In the networked environment 10, the enterprise computing environment 100 and the client devices 160 can communicate data among each other using one or more network transfer protocols or interconnect frameworks, such as hypertext transfer protocol (HTTP), simple object access protocol (SOAP), representational state transfer (REST), real-time transport protocol (RTP), real time streaming protocol (RTSP), real time messaging protocol (RTMP), user datagram protocol (UDP), internet protocol (IP), transmission control protocol (TCP), other protocols and interconnect frameworks, and combinations thereof.

The client devices 160 are representative of one or more client devices. The client devices 160 can be embodied as any computing devices, processing circuits, or processor based devices or systems, including those in the form of desktop computers, laptop computers, tablet computers, personal digital assistants, cellular telephones, or wearable computing devices, among other example computing devices and systems. The client devices 160 can include various peripheral devices or components. The peripheral devices can include input or communications devices or modules, such as keyboards, keypads, touch pads, touch screens, microphones, cameras, wireless communications modules (e.g., infra-red, WI-FI, or BLUETOOTH®), buttons, switches, or sensors. The peripheral devices can also include a display, indicator lights, speakers, global positioning system (GPS) circuitry, accelerometers, gyroscopes, or other peripheral devices depending upon the primary purpose or function of the client devices 160.

As illustrated in FIG. 1, the client devices 160 include one or more applications 162 executing on the client device 160. As one example, an application 162 can be used to operate the client device 160 as a thin client. In that scenario, the application 162 can provide a terminal interface to access one or more of the virtual machines 136. Other examples of the applications 162 include hypertext-based network browsers, such as the Internet Explorer®, Firefox®, Chrome®, Safari®, or Silk® browsers, e-mail clients, messaging clients, document editors or viewers, file browsers, and other applications for other purposes.

Turning back to the operation of the enterprise computing environment 100, the endpoint manager 130 can be configured to manage operational aspects of one or more of the virtual machines 136 hosted by the VDI 134. The endpoint manager 130 can provide a modern management approach for the administration of the virtual machines 136 over a full lifecycle of the virtual machines 136. The management approach can be agnostic to the type(s) of operating systems (OSs) executed on the virtual machines 136, so that the endpoint manager 130 can be relied upon to manage a number of different OSs executing on the virtual machines 136.

In some cases, the endpoint manager 130 can be configured to manage computing devices in addition to or other than the virtual machines 136 hosted by the VDI 134. For example, while some of the client devices 160 can be relied upon as thin clients for the virtual machines 136, other client devices 160 can be directly enrolled and managed by the endpoint manager 130. Additionally, the endpoint manager 130 can be configured to operate as an endpoint manager for both desktop and mobile OSs and devices, including a combination of virtual machines hosted by the VDI 134 and other standalone desktop and mobile devices that are not hosted by the VDI 134.

The endpoint manager 130 is configured to centralize the management, configuration, and security of enrolled machines, including the management and configuration of applications and content on the machines. As examples, the endpoint manager 130 can provide identity management for access control, provide push-based delivery of policies, patches, applications, and updates, and monitor operational aspects of the virtual machines 136. The endpoint manager 130 can provide an application program interface (API) framework to facilitate the centralized the management, configuration, and security of the virtual machines 136.

The endpoint manager 130 can start an enrollment process for any of the virtual machines 136 (among other virtualized and non-virtualized machines and devices) based on an enrollment call from a virtual machine 136 as described in further detail below. As part of the enrollment process, the endpoint manager 130 can register and configure the virtual machines 136 for endpoint management. To that end, the endpoint manager 130 can interface with the OSs of the virtual machines 136 (and/or management applications or agents executing on the virtual machines 136) to install and uninstall certain software components on the virtual machines 136. The software components can include applications, resources, libraries, drivers, configurations, policies and other related components. The endpoint manager 130 can also transfer device management data, including management policies, compliance rules, configuration data, and other policies and rules to the virtual machines 136. During and after this enrollment process, the endpoint manager 130 can gather various types of data related to the status, use, and operation of the virtual machines 136. The data can be stored by the endpoint manager 130 in the virtual machine database 122 of the data store 120 for later reference and processing.

The policy engine 132 can be configured to review the status, use, and operation of the virtual machines 136 and compare those parameters against the management policies 124 of the data store 120 over time. The policy engine 132 can enforce various policies on the virtual machines 136. For example, the policy engine 132 can determine whether or not the virtual machines 136 include certain software updates (or need updating), whether or not the virtual machines 136 are authorized for use by certain users based on credentials, whether or not the virtual machines 136 should be instantiated or destroyed, and review other management policies applicable to the virtual machines 136. The management policies 124 can change over time as management considerations change, and the changes can be driven by administrators, artificial intelligence monitors, and other driving factors. The endpoint manager 130 can work in connection with or at the direction of feedback provided by the policy engine 132.

The VDI 134 can be configured to manage the computing hardware of the enterprise computing environment 100 to host the virtual machines 136. In some cases, the VDI 134 can manage the computing hardware of the enterprise computing environment 100 as it is logically pooled by the SDDC 138, as described below, but the SDDC 138 can also be omitted (or combined as part of the VDI 134) in some cases. The VDI 134 logically organizes the resources of the enterprise computing environment 100 into separate computing platforms, each including processing, storage, networking, and other resources. The platforms provide isolated environments to host each of the virtual machines 136. Each virtual machine 136 can support the execution of an OS and various applications, and an image or display of each virtual machine 136 can be delivered over the network 150 to one of the client devices 160. A user of a client device 160 can interact with the OS and the applications of a virtual machine 136 as if they were running locally on the client device 160.

The VDI 134 can instantiate and host a number of different types of virtual machines. For example, the virtual machines 136 can be embodied as persistent or non-persistent virtual machines. Persistent virtual machines can be instantiated (e.g., created), used, customized, and saved or maintained for future use, similar to traditional computing devices. Non-persistent virtual machines can be instantiated, used, customized, and then destroyed or reverted to an original state each time a user logs out. The virtual machines 136 can also be instantiated using OSs having different or separate product keys, registry settings, and other configurations. As another example, any one of the virtual machines 136 can be created as an instant clone of another one of the virtual machines 136, based on a copy of product keys, registry settings, and other configurations. The endpoint manager 130 can enroll any suitable number of persistent, non-persistent, and instant clone virtual machines for endpoint management. The endpoint manager 130 can distinguish between the virtual machines 136, even if a number of them are instant clones of each other, using updated or amended registry data stored in the virtual machine database 122. For example, the endpoint manager 130 can modify one or more registry entries in the virtual machine database 122 for individual instant clones to distinguish them from each other.

The SDDC 138 is configured to logically organize and deliver the resources of the enterprise computing environment 100 as a type of service to the VDI 134. Through the SDDC 138, the control of the hardware resources and configurations of the enterprise computing environment 100 can be automated by a software or API interface with the SDDC 138. For example, the SDDC 138 can control the network resources of the of the enterprise computing environment 100 by splitting the available bandwidth into independent channels that can each be assigned and reassigned in real time. Similarly, the SDDC 138 can organize and control the physical storage devices of the enterprise computing environment 100 into a number of managed storage devices. With the SDDC 138, the identity, type, and amount of the physical computing resources of the enterprise computing environment 100 is disconnected from the VDI 134. In some cases, the SDDC 138 can be omitted or combined, at least in part, with the VDI 134.

Figure 2:
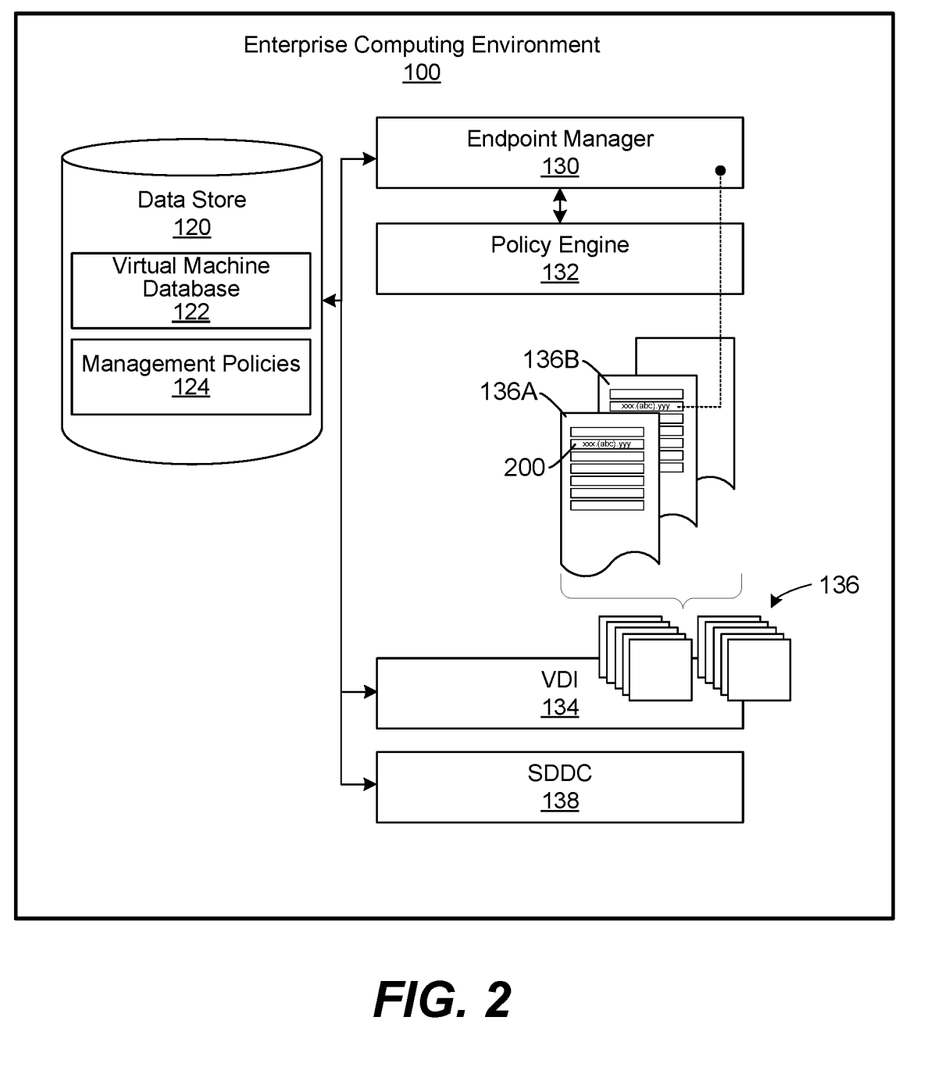
FIG. 2 illustrates an example of the operation of the networked environment shown in FIG. 1 according to various examples described herein.

FIG. 2 illustrates an example of the operation of the enterprise computing environment 100 shown in FIG. 1. The overall operation is to achieve a new way to enroll the virtual machines 136 hosted on the VDI 134 with the endpoint manager 130, similar to the way that groups of desktop computers are enrolled in a unified endpoint management solutions. To that end, the VDI 134 can be relied upon to prepare and configure a master or golden image based on a new master virtual machine, such as the master virtual machine 136A. For example, a user of one of the client devices 160 can interface with the VDI 134 on the enterprise computing environment 100 to instantiate the master virtual machine 136A. The user can also configure the master virtual machine 136A, to the extent necessary, to include a number of applications and services that will be a standard or baseline for new virtual machines. The applications can include certain tools relied upon by the endpoint manager 130 to assist with enrollment as described below.

As part of the configuration, the master virtual machine 136A can also be modified to incorporate or install a service 200. The service 200 can be designed to permanently execute on the master virtual machine 136A and is, thus, user independent. The service 200 can also have elevated permissions so as not to require any "run as admin" rights or user prompts to execute.

The service 200 can be designed to perform one or more management service calls to the endpoint manager 130 at one or more times during the boot, login, logoff, or other workflow points of the master virtual machine 136A. The service 200 can be installed on the master virtual machine 136A such that it is triggered to execute at an early stage during the initialization, boot, or login process of the master virtual machine 136A. As one example, the service 200 can conduct event listening against an events messaging service. The service 200 can then be triggered when the master virtual machine 136A receives a logon notification (e.g., event id 4624). Thus, the service 200 can be triggered to perform an enrollment call when a user of the master virtual machine 136A provides login credentials and logs on to the master virtual machine 136A.

As another example, the service 200 can be designed to trigger at another, earlier time during the boot process of the master virtual machine 136A, such as when other system services of the master virtual machine 136A are executed or triggered. In any case, the service 200 is preferably designed to perform an enrollment call at an early initialization stage after the master virtual machine 136A is started. Similarly, the service 200 can be triggered to perform another call, such as a de-enrollment call, when a user of the master virtual machine 136A logs off of the master virtual machine 136A.

After the master virtual machine 136A is fully configured and the service 200 is installed, the VDI 134 can store an image of the master virtual machine 136A in the data store 120 as a master or gold image. The VDI 134 can then use the master image to instantiate any number of virtual machines, including one or more of the virtual machines 136. For example, a user of one of the client devices 160 can interface with the VDI 134 to instantiate the virtual machine 136B, among others, based on the master image of the master virtual machine 136A. The virtual machine 136B includes the service 200 because it was instantiated using the master image of the master virtual machine 136A. The VDI 134 can instantiate any number of virtual machines based on the master image, including any combination of persistent, non-persistent, and instant clone virtual machines.

At some point after the virtual machine 136B is started or booted, the service 200 will execute and perform an enrollment call to the endpoint manager 130. Depending upon the manner in which it is incorporated into the master image, the service 200 can execute at an early stage during the boot or login process of the virtual machine 136B. The service 200 can execute when a user of the virtual machine 136B provides login credentials and logs on to the virtual machine 136B. As another example, the service 200 can execute at another, earlier time during the boot process of the virtual machine 136B, such as when other system services are first started.

In response to the enrollment call, the endpoint manager 130 can start an enrollment process for the virtual machine 136B. As part of the enrollment process, the endpoint manager 130 can register and configure the virtual machine 136B for endpoint management. To that end, the endpoint manager 130 can interface with the OS of the virtual machine 136B (and/or management applications or agents executing on the virtual machine 136B) to install and uninstall certain software components on the virtual machine 136B. The software components can include applications, resources, libraries, drivers, configurations, policies and other related components.

The endpoint manager 130 can also transfer device management data, including management policies, compliance rules, configuration data, and other policies and rules to the virtual machine 136B. During and after this enrollment process, the endpoint manager 130 can gather various types of data related to the status, use, and operation of the virtual machine 136B. The data can be stored by the endpoint manager 130 in the virtual machine database 122 of the data store 120 for later reference and processing.

The automated enrollment of the virtual machine 136B with the endpoint manager 130 facilitates a type of modern management solution for the virtual machine 136B. The use of the service 200 to automate the enrollment of the virtual machine 136B is preferable over manually enrolling the virtual machine 136B, which was a previous solution for virtual machines hosted by the VDI 134. Any or all of the virtual machines 136 can be enrolled in a similar way if they include the service 200. The enrollment can vary to some extent based on various factors, such as the credentials of the users that log on to the virtual machines 136, the type(s) of the virtual machines 136 (e.g., persistent, non-persistent, instant clones), and any updates to the management policies 124 enforced by the policy engine 132. In some cases, the virtual machine 136B can also be de-enrolled by the endpoint manager 130 upon receipt of another call from the service 200, such as when a user of the master virtual machine 136A logs off of the master virtual machine 136A.

The concepts described herein are not limited to use with virtual machines. Instead, a master image including the service 200 can be relied as an image for other computing devices in the networked environment 10, including those coupled to the network 150. When the computing devices are started, the service 200 can execute and perform an enrollment call to the endpoint manager 130. In that case, the enrollment call be routed through the network 150.

Figure 3:
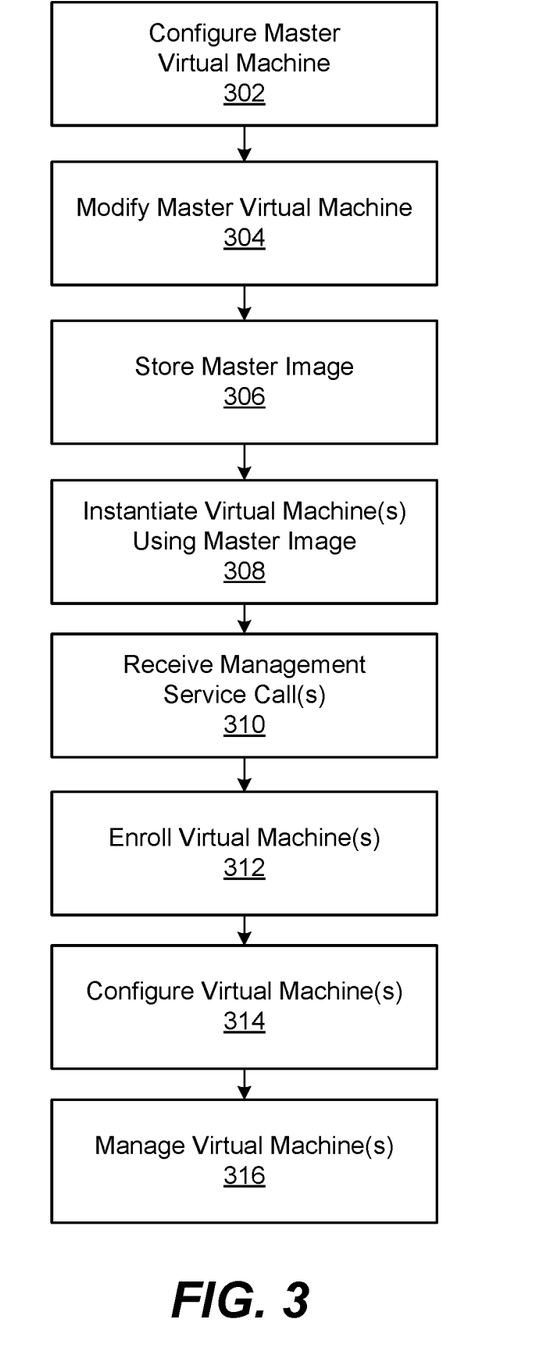
FIG. 3 illustrates an example process for virtual desktop infrastructure management performed by the networked environment shown in FIG. 1 according to various examples described herein.

FIG. 3 illustrates an example process for virtual desktop infrastructure management performed by the networked environment shown in FIG. 1 according to various examples described herein. The process shown in FIG. 3 is described in connection with the components of the networked environment 10 shown in FIG. 1, although other components in other environments can perform the process. Although the process diagrams show an order of operation or execution, the order can differ from that which is shown. For example, the order of execution of two or more process steps can be switched relative to the order shown or as described below. Also, two or more process steps shown in succession can be executed concurrently or with partial concurrence. Further, in some examples, one or more of the process steps shown in the process diagrams can be skipped or omitted.

At step 302, the process can include configuring a master virtual machine to form a master image. For example, a user of one of the client devices 160 can interface with the VDI 134 on the enterprise computing environment 100 to instantiate the master virtual machine 136A. The user can also configure the master virtual machine 136A, to the extent necessary, to include a number of applications and services that will be a standard or baseline for new virtual machines.

At step 304, the process can include modifying the master virtual machine to incorporate a management service in the master image. For example, a user of one of the client devices 160 can interface with the VDI 134 to install the service 200 on the master virtual machine 136A. As described above, the service 200 is designed to perform an enrollment call to the endpoint manager 130 upon execution. The service 200 can be installed on the master virtual machine 136A such that it triggers the enrollment call at an early stage during the initialization, boot, or login process of the master virtual machine 136A. As one example, the service 200 can trigger when a user of the master virtual machine 136A provides login credentials and logs on to the master virtual machine 136A. As another example, the service 200 can trigger at another, earlier time during the boot process of the master virtual machine 136A, such as when various system services of the master virtual machine 136A are executed. In any case, the service 200 is preferably installed to execute at an early initialization stage after the master virtual machine 136A is started.

At step 306, the process can include storing a copy of the master virtual machine 136A as a master or golden image. The master image can be stored in the data store 120. As described in further detail below, the master image can be used to instantiate a number of virtual machines to be hosted on the VDI 134. Each virtual machine instantiated based on the master image will include the service 200.

At step 308, the process includes instantiating one or more of the virtual machines 136 using the master image stored in the data store 120 at step 306. For example, a user of one of the client devices 160 can interface with the VDI 134 to instantiate one or more of the virtual machines 136 based on the master image. The virtual machines 136, in that case, will include the service 200 because it was instantiated using the master image of the master virtual machine 136A. The VDI 134 can instantiate any number of virtual machines 136 at step 308 based on the master image, including any combination of persistent, non-persistent, and instant clone virtual machines.

At step 310, the process includes the endpoint manager 130 receiving a management service call, such as an enrollment call, from one or more of the virtual machines 136 instantiated at step 308. Particularly, at some point after each of the virtual machines 136 is started or booted, the service 200 will execute and perform an enrollment call to the endpoint manager 130, and the endpoint manager 130 will receive the call at step 310. The service 200 can execute at an early stage during the boot or login process of each virtual machine 136 instantiated at step 308. The service 200 can execute when a user provides login credentials and logs on to the virtual machine 136. As another example, the service 200 can execute at another, earlier time during the boot process, such as when other system services are first started.

At step 312, the process includes the endpoint manager 130 enrolling the one or more virtual machines 136 that generated the enrollment calls received at step 310. As part of the enrollment process, the endpoint manager 130 can register each virtual machine 136 for endpoint management. As part of the registration the endpoint manager 130 can gather information from the virtual machines 136 and store the data in the virtual machine database 122 in the data store At step 314, the process includes the endpoint manager 130 configuring the virtual machines 136. To that end, the endpoint manager 130 can interface with the OS of the virtual machines (and/or management applications or agents executing on the virtual machines) to install and uninstall certain software components on the virtual machines 136. The software components can include applications, resources, libraries, drivers, configurations, policies and other related components.

The endpoint manager 130 can also transfer device management data, including management policies, compliance rules, configuration data, and other policies and rules to the virtual machines 136. During and after this enrollment process, the endpoint manager 130 can gather various types of data related to the status, use, and operation of the virtual machines 136. The data can be stored by the endpoint manager 130 in the virtual machine database 122 of the data store 120 for later reference and processing.

The automated enrollment and configuration of the virtual machines 136 with the endpoint manager 130 at steps 312 and 314 facilitates a type of modern management solution for the virtual machines 136. The use of the service 200 to automate the enrollment of the virtual machines 136 is preferable over manually enrolling the virtual machines 136, which was a previous solution. Any or all of the virtual machines 136 can be enrolled in a similar way. The enrollment can vary to some extent based on various factors, such as the credentials of the users that log on to the virtual machines 136, the type(s) of the virtual machines 136 (e.g., persistent, non-persistent, instant clones), and any updates to the management policies 124 enforced by the policy engine 132.

At step 316, the process includes the endpoint manager 130 managing the one or more virtual machines 136. The management can include the continued application and enforcement of various policies by the policy engine 132. Over time, the policy engine 132 can be configured to review the status, use, and operation of the virtual machines 136 and compare those parameters against the management policies 124 of the data store 120.

The policy engine 132 can enforce various policies on the virtual machines 136. For example, the policy engine 132 can determine whether or not the virtual machines 136 include certain software updates (or need updating), whether or not the virtual machines 136 are authorized for use by certain users based on credentials, whether or not the virtual machines 136 should be instantiated or destroyed, and review other management policies applicable to the virtual machines 136. The management policies 124 can change over time as management considerations change, and the changes can be driven by administrators, artificial intelligence monitors, and other driving factors. The endpoint manager 130 can work in connection with or at the direction of the policy engine 132 for the continued management of the virtual machines 136.

The flowchart in FIG. 3 shows examples of the functions and operations of the components described herein. The components described herein can be embodied in hardware, software, or a combination of hardware and software. If embodied in software, each element can represent a module or group of code that includes program instructions to implement the specified logical function(s). The program instructions can be embodied in the form of, for example, source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

The enterprise computing environment 100 can include at least one processing circuit. Such a processing circuit can include, for example, one or more processors and one or more storage or memory devices coupled to a local interface. The local interface can include, for example, a data bus with an accompanying address/control bus or any other suitable bus structure. Similarly, each of the client devices 160 can include at least one processing circuit. Such a processing circuit can include, for example, one or more processors and one or more storage or memory devices coupled to a local interface.

The storage or memory devices can store data or components that are executable by the processors of the processing circuit. For example, the endpoint manager 130 and/or other components can be stored in one or more storage devices and be executable by one or more processors in the enterprise computing environment 100. Similarly, the application 162 and other components can be stored in one or more storage devices and be executable by one or more processors in the client devices 160.

The endpoint manager 130, the policy engine 132, the VDI 134, the SDDC 138, and other components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include, for example, one or more microprocessors, discrete logic circuits having logic gates for implementing various logic functions upon an application of one or more data signals, application specific integrated circuits (ASICs) having appropriate logic gates, and/or programmable logic devices (e.g., field-programmable gate array (FPGAs), and complex programmable logic devices (CPLDs)).

Also, one or more of the components described herein that include software or program instructions can be embodied in any non-transitory computer-readable medium for use by or in connection with an instruction execution system such as, a processor in a computer system or other system. The computer-readable medium can contain, store, and/or maintain the software or program instructions for use by or in connection with the instruction execution system.

A computer-readable medium can include a physical media, such as, magnetic, optical, semiconductor, and/or other suitable media. Examples of a suitable computer-readable media include, but are not limited to, solid-state drives, magnetic drives, or flash memory. Further, any logic or component described herein can be implemented and structured in a variety of ways. For example, one or more components described can be implemented as modules or components of a single application. Further, one or more components described herein can be executed in one computing device or by using multiple computing devices.

Further, any logic or applications described herein, including endpoint manager 130, the policy engine 132, the VDI 134, the SDDC 138, and other components, can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices. Additionally, terms such as "application," "service," "system," "engine," "module," and so on can be used interchangeably and are not intended to be limiting.

The above-described examples of the present disclosure are merely possible examples of implementations set forth for a clear understanding of the principles of the disclosure. Many variations and modifications can be made without departing substantially from the spirit and principles of the disclosure. All such modifications and variations are intended to be included herein within the scope of this disclosure and protected by the following claims.

Therefore, the following is claimed:

1. A method for virtual desktop infrastructure management, comprising:
   configuring a master virtual machine;
   modifying the master virtual machine to incorporate management service code in a modified version of the master virtual machine that is stored as a master image;
   instantiating, by at least one computing device, a virtual machine using the master image, wherein a management service comprising the management service code conducts event listening against an events messaging service of the virtual machine;
   identifying, by the management service of the virtual machine, a logon event to access the virtual machine, the logon event being identified based on the event listening against the events messaging service;
   performing, by the management service of the virtual machine, an enrollment process that enrolls the virtual machine with an endpoint manager, the enrollment process comprising: an enrollment call to the endpoint manager, and installation of at least one management policy according to login credentials that are user-entered in a login process associated with the logon event for the virtual machine;
   managing the virtual machine using the endpoint manager; and
   de-enrolling, by the management service of the virtual machine, the virtual machine from the endpoint manager based on a logoff event identified based on the event listening against the events messaging service.

2. The method for virtual desktop infrastructure management of claim 1, wherein the modifying comprises installing the management service on the master virtual machine to execute as part of a login process of the master virtual machine.

3. The method for virtual desktop infrastructure management of claim 1, wherein the endpoint manager comprises a virtual desktop infrastructure endpoint manager.

4. The method for virtual desktop infrastructure management of claim 1, wherein:
   the instantiating comprises instantiating the virtual machine as a host on a virtual desktop infrastructure of a computing environment.

5. The method for virtual desktop infrastructure management of claim 1, wherein the enrollment process further comprises installation of at least one application.

6. The method for virtual desktop infrastructure management of claim 1, wherein the enrollment process further comprises installation of software components comprising the at least one management policy, at least one resource, at least one library, and at least one driver.

7. The method for virtual desktop infrastructure management of claim 1, wherein:
   the instantiating comprises instantiating a plurality of virtual machines using the master image; and
   the enrolling comprises enrolling individual ones of the plurality of virtual machines with the endpoint manager.

8. The method for virtual desktop infrastructure management of claim 1, further comprising:
   instantiating a plurality of instant clones of the virtual machine; and
   enrolling individual ones of the plurality of instant clones with the endpoint manager by modifying at least one registry entry for the individual ones of the plurality of instant clones in a database of managed virtual machines.

9. A non-transitory computer-readable medium embodying program code for virtual desktop infrastructure management that, when executed by at least one computing device, directs the at least one computing device to at least:
   configure a master virtual machine;
   modify the master virtual machine to incorporate management service code in a modified version of the master virtual machine that is stored as a master image;
   instantiate a virtual machine using the master image, wherein a management service comprising the management service code conducts event listening against an events messaging service of the virtual machine;

identify, by the management service of the virtual machine, a logon event to access the virtual machine, the logon event being identified based on the event listening against the events messaging service;

perform, by the management service of the virtual machine, an enrollment process that enrolls the virtual machine with an endpoint manager, the enrollment process comprising: an enrollment call to the endpoint manager, and installation of at least one management policy according to login credentials that are user-entered in a login process associated with the logon event for the virtual machine;

manage the virtual machine using the endpoint manager; and de-enroll, by the management service of the virtual machine, the virtual machine from the endpoint manager based on a logoff event identified based on the event listening against the events messaging service.

10. The non-transitory computer-readable medium according to claim 9, wherein the at least one computing device is further directed to install the management service on the master virtual machine to execute as part of a login process of the master virtual machine.

11. The non-transitory computer-readable medium according to claim 9, wherein the endpoint manager comprises a virtual desktop infrastructure endpoint manager.

12. The non-transitory computer-readable medium according to claim 9, wherein the at least one computing device is further directed to:
instantiate the virtual machine as a host on a virtual desktop infrastructure of a computing environment.

13. The non-transitory computer-readable medium according to claim 9, wherein the enrollment process further comprises installation of at least one application.

14. The non-transitory computer-readable medium according to claim 9, wherein the enrollment process further comprises installation of software components comprising the at least one management policy, at least one resource, at least one library, and at least one driver.

15. The non-transitory computer-readable medium according to claim 9, wherein the at least one computing device is further directed to:
instantiate a plurality of virtual machines using the master image; and
enroll individual ones of the plurality of virtual machines with the endpoint manager.

16. The non-transitory computer-readable medium according to claim 9, wherein the at least one computing device is further directed to:
instantiate a plurality of instant clones of the virtual machine; and
enroll individual ones of the plurality of instant clones with the endpoint manager by modifying at least one registry entry for the individual ones of the plurality of instant clones in a database of managed virtual machines.

17. At least one computing device for virtual desktop infrastructure management, comprising:
a memory device configured to store computer-readable instructions thereon; and
at least one processing device configured, through execution of the computer-readable instructions, to direct the at least one computing device to at least:
configure a master virtual machine;
modify the master virtual machine to incorporate management service code in a modified version of the master virtual machine that is stored as a master image;
instantiate a virtual machine using the master image, wherein a management service comprising the management service code conducts event listening against an events messaging service of the virtual machine;
identify, by the management service of the virtual machine, a logon event to access the virtual machine, the logon event being identified based on the event listening against the events messaging service;
perform, by the management service of the virtual machine, an enrollment process that enrolls the virtual machine with an endpoint manager, the enrollment process comprising: an enrollment call to the endpoint manager, and installation of at least one management policy tailored based on login credentials that are user-entered in a login process associated with the logon event for the virtual machine;
manage the virtual machine using the endpoint manager; and
de-enroll, by the management service of the virtual machine, the virtual machine from the endpoint manager based on a logoff event identified based on the event listening against the events messaging service.

18. The computing device according to claim 17, wherein the at least one processing device is further directed to install the management service on the master virtual machine to execute as part of a login process of the master virtual machine.

19. The computing device according to claim 17, wherein the at least one processing device is further directed to:
instantiate the virtual machine as a host on a virtual desktop infrastructure of a computing environment.

20. The computing device according to claim 17, wherein the enrollment process further comprises installation of at least one application.

* * * * *